J. H. BEAN.
Horse Hay-Rakes.
No. 140,671.                      Patented July 8, 1873.
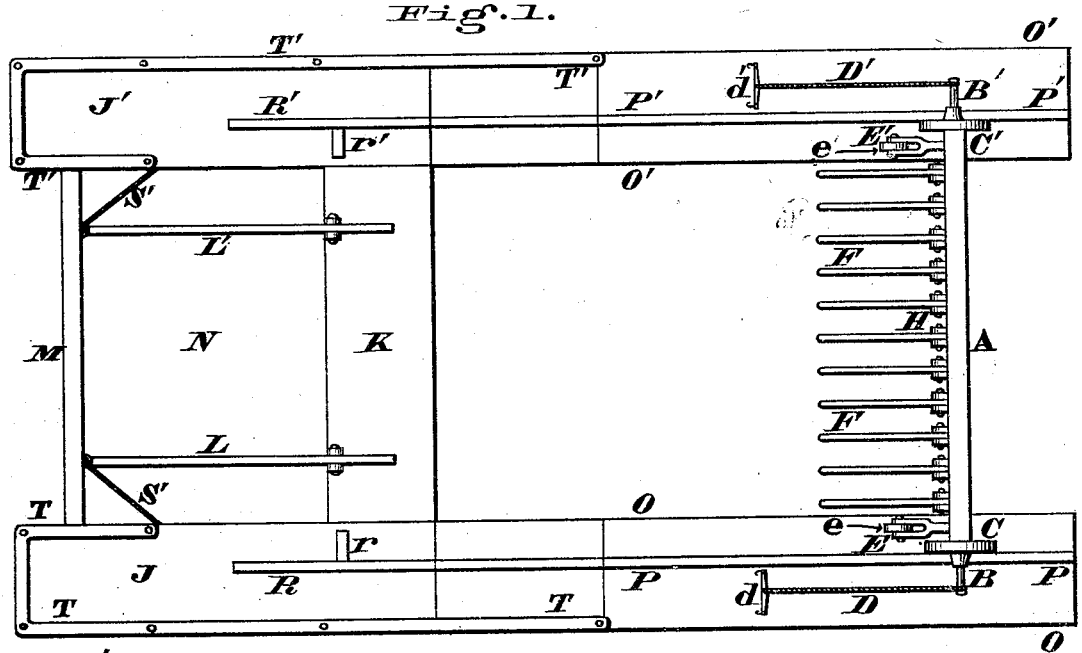
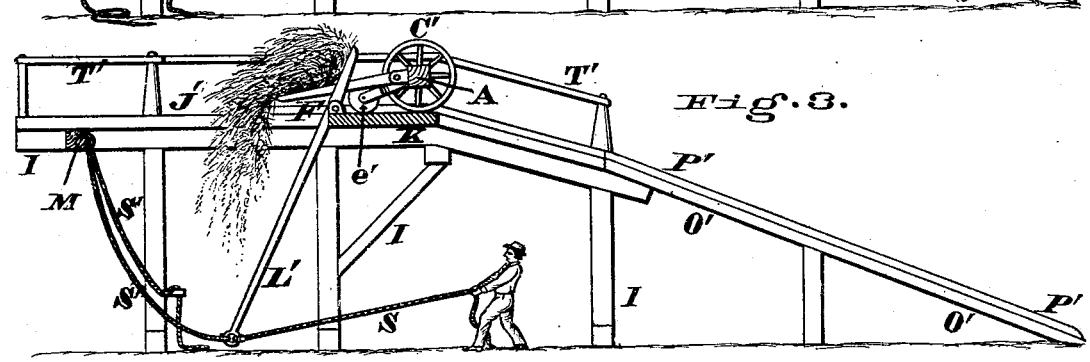
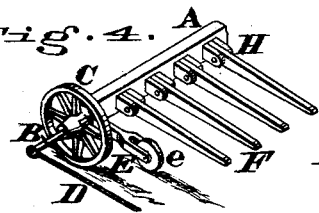
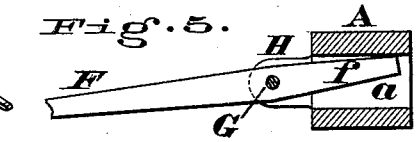

UNITED STATES PATENT OFFICE.

JACOB H. BEAN, OF MACON, ILLINOIS.

IMPROVEMENT IN HORSE HAY-RAKES.

Specification forming part of Letters Patent No. 140,671, dated July 8, 1873; application filed February 24, 1873.

*To all whom it may concern:*

Be it known that I, JACOB H. BEAN, of Macon, Macon county, Illinois, have invented a new and useful Hay-Rake, of which the following is a specification:

The object of this invention is to provide a simple and efficient appliance, wherewith hay can be gathered from the field and deposited in a wagon or upon a stack; and my invention consists in a rake constructed with pivoted teeth, having limited play within mortises in the rake-head. The head has longitudinal arms, forming journals for ground-wheels, and projecting to afford means for attaching horses, one at each end. Rollers running in the ends of arms, fixed transversely in the rake-head, support the teeth at the proper inclination, and the whole apparatus is adapted for raking and gathering hay, and by means of inclined ways elevating it for discharge upon a mow or stack.

Figure 1 is a plan of my hay-rake and elevator, the rake being represented in the act of ascending the inclined planes. Fig. 2 is a transverse section through the same, the swinging levers being represented in position for engaging under the load on the rake. Fig. 3 is a similar section, the rake being represented as having ascended the elevator, and the pivoted levers shown in the act of discharging the hay from the teeth of said rake. Fig. 4 is a perspective view of one end of the rake-head; and Fig. 5 is a transverse section through the rake-head on an enlarged scale.

The rake-head A consists of a stout beam, of any suitable length, and having gudgeons B B' at its ends, upon which are journaled the ground-wheels C C'. The gudgeons B B' project some distance beyond the hubs of the ground-wheels, so as to afford room for attachment of the ropes or chains D D', to whose ends are secured the singletrees $d\ d'$. To these singletrees are hitched the animals. Projecting from the front side of the rake-head, and near the ground-wheels, are arms or brackets E E', having journaled in them small rollers $e\ e'$. These rollers, in conjunction with the wheels C C', serve to maintain the rake-head in such a position as to render its teeth the most effective for gathering up the hay. The rake-teeth F are of the ordinary shape, but are secured to the head in a novel way, which greatly increases their efficiency. Instead of being rigidly secured to the head, they are united to the same by pivots G, which pass through them and engage with lugs or ears H, the latter being attached to the front side of said rake-head, as more clearly shown in Figs. 4 and 5. The rear ends $f$ of the teeth occupy mortises or slots $a$, in the head, which mortises are large enough to permit considerable vertical movement of the teeth, whereby they are rendered self-adjusting, and are capable of yielding in passing over uneven ground.

The elevator which I employ, in conjunction with the above-described rake, is arranged as follows: I is a frame or staging, which supports two horizontal platforms, J J', and these platforms are united by a beam or bridge, K, to which is pivoted one or more swinging levers, L L'. M is a bar or brace, which connects the outer ends of the platforms J J'. N is an opening or hatch-way, between the platforms J J', the bridge K, and brace M. Access is had to the platforms J J' by means of inclines O O', which extend from the front sides of said platforms down to the ground. These inclines should be so gradual as to permit the horses to draw the rake up them with ease and safety. Tracks or rails P P' and R R', laid respectively upon the inclines and platforms, confine the rake-head to a proper path as it ascends and descends the elevator. The platforms J J' may, if preferred, be provided with stops $r\ r'$, for the purpose of arresting the rake at the proper position upon said platforms. Ropes S S', or equivalent appliances, may be employed for operating the disengaging-levers L L'. T T' are railings, around the elevated platforms J J'.

The operation of my rake and elevator is as follows: The horses are first hitched to the singletrees $d\ d'$, and the implement is then drawn over the field until a sufficient load of hay has accumulated upon the teeth F of the rake. When this has been accomplished the rake is conducted to the elevator, and the horses driven up the inclines O O', care being taken to have the ground-wheels C C' run inside the tracks P P'. After completing the ascent of said inclines the rake is drawn upon the platform J J', and maintained in a proper position upon the same by the rails R R'. The rake is drawn along these platforms until its head reaches the opening or hatchway N, when its further progress is arrested by the stops r r', or by checking the team. As the teeth of the rake pass over the hatchway, the swinging levers L L' are adjusted or are pressed by the advancing load to the position shown in Fig. 2; but as soon as the motion of the rake is arrested these levers are then turned by the attendant pulling the rope S, and caused to assume the vertical position represented in Fig. 3. In this position they engage with the load of hay, and the moment the rake is drawn back off of the platform said levers act to disengage the hay from the teeth, and cause it to fall through the opening or hatch-way N. When thus discharged the hay may be delivered into a wagon or deposited upon a stack. The rake being delivered of its load is then allowed to descend the inclines O O', and is once more taken to the field and loaded, after which the previously-described operation is repeated, and continued as often as necessary. After as much hay has been deposited as to completely fill up the hatch-way or opening N, the entire elevating apparatus, including the staging, inclines, platforms, &c., is then shifted bodily along the ground, either to the right or left, so as to allow another deposit to be made along side the previous one, and thus form a continuous rick or stack of hay.

Instead of being shifted to the right or left the elevator can be moved either backward or forward, so as to permit the hay being deposited in a rick or row parallel with the inclines O O' and platform J J'.

It will be seen that my elevator is arranged in such a manner as to allow a wagon to be driven in under the hatchway N, and to be loaded with hay by a few operations as the hay is moved in large masses, and by the power of steam or animals, and not by hand.

The elevating apparatus is not claimed in this application, and is only alluded to in order to make clear the mode of using the improved rake, to which the invention relates.

I claim as new and of my invention—

The combination of the head A, projecting-gudgeons B B', ground-wheels C C', hitching devices D D' d d', arms E E', rollers e e', pivoted teeth F f G H, and mortises a, for the purpose herein described.

In testimony of which invention I hereunto set my hand.

JACOB H. BEAN.

Witnesses:
A. G. HARRIS,
J. S. RUBY.